Oct. 14, 1958     S. S. PRENTISS     2,855,627
PELLET MOLDING APPARATUS
Filed Nov. 6, 1953     4 Sheets-Sheet 2
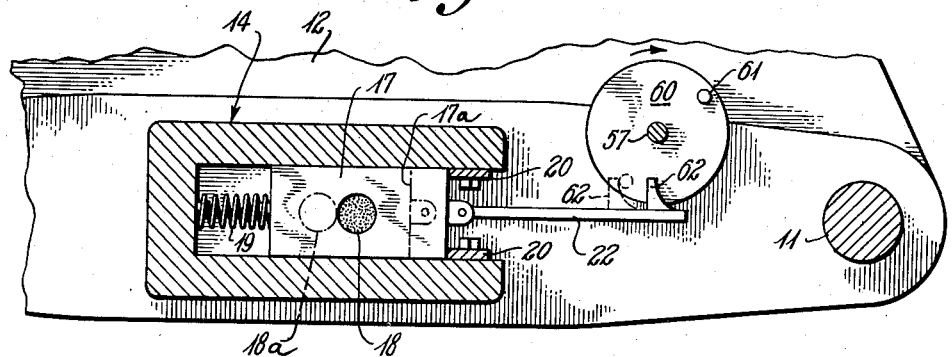
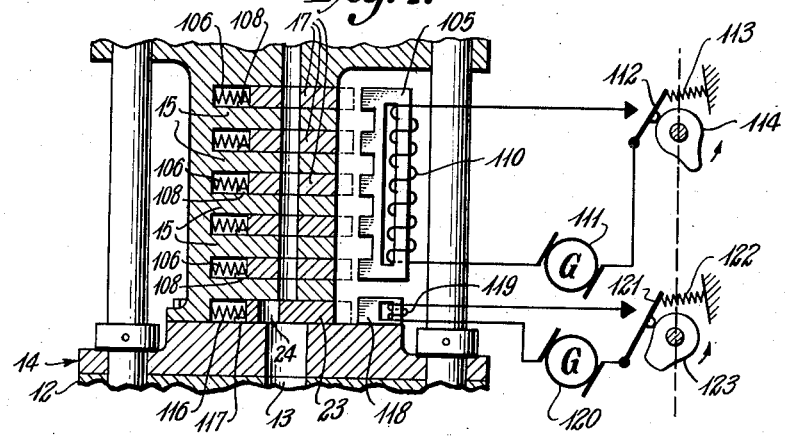
INVENTOR.
S. S. Prentiss
BY
Hudson & Young
ATTORNEYS

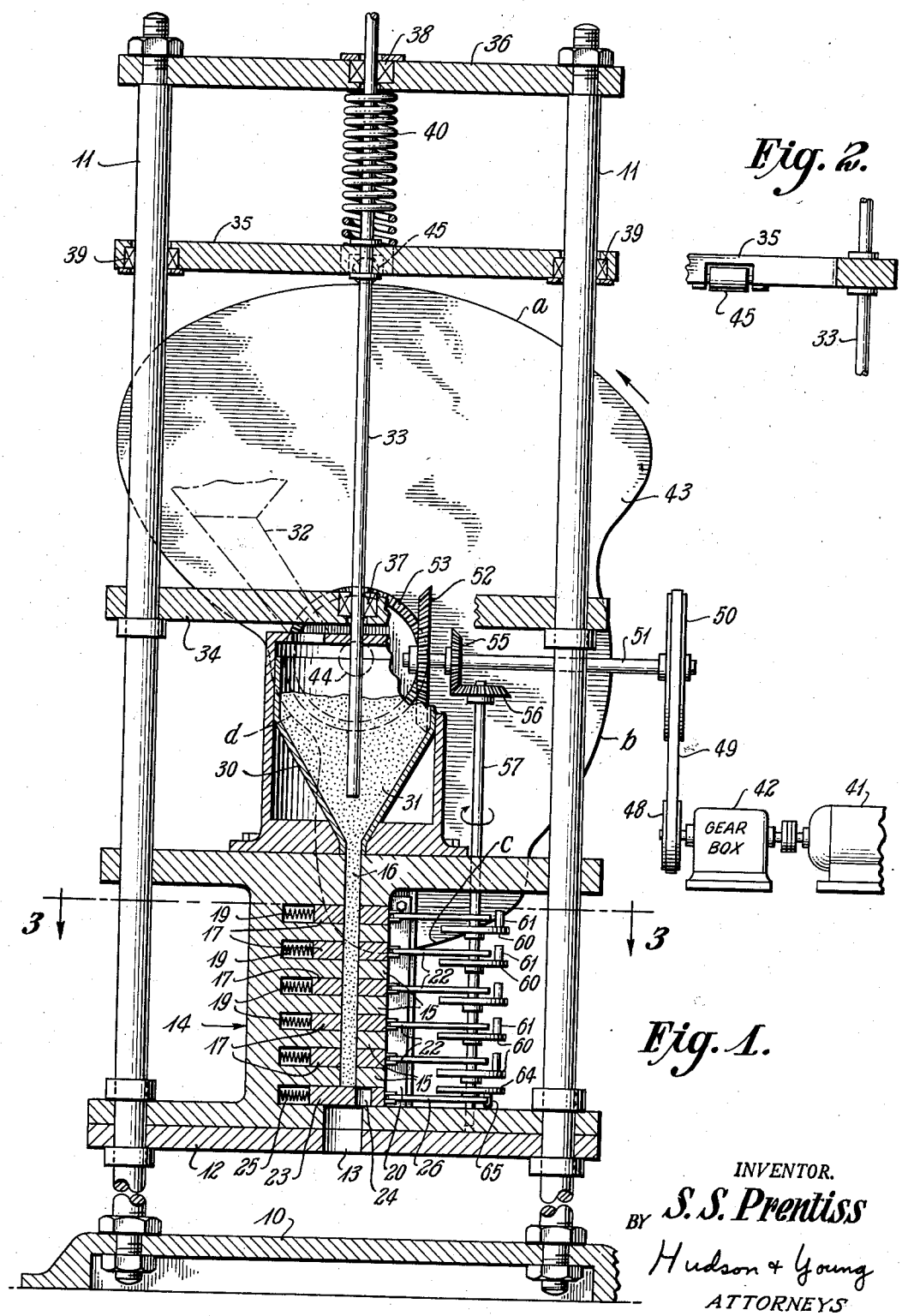

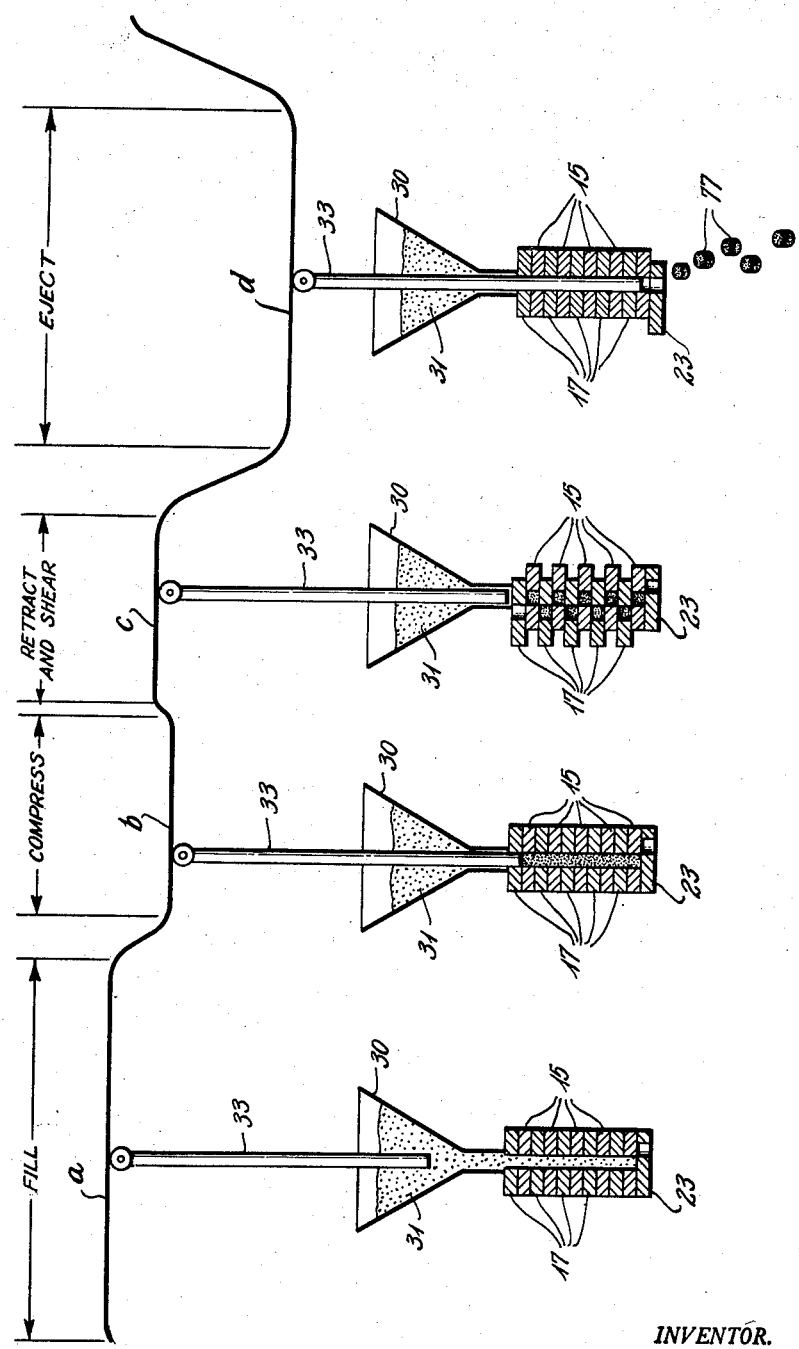

United States Patent Office 2,855,627
Patented Oct. 14, 1958

2,855,627
PELLET MOLDING APPARATUS

Spencer S. Prentiss, Bartlesville, Okla., assignor to Phillips Petroleum Company, a corporation of Delaware Application November 6, 1953, Serial No. 390,462

6 Claims. (Cl. 18—5)

This invention relates to a method of and apparatus for forming a plurality of pellets in a single operation. In one specific aspect it relates to a method of and apparatus for molding a plurality of pellets by comprising a column of material and subsequently dividing the column into individual pellets.

A large number of industrial items can readily be formed by the use of compression machines. These items include, among other things, electrical components, machine parts, ceramics, plastics and chemical tablets. Generally, a powdered material is fed into a mold which is subjected to sufficient pressure to solidify the material. While some of the known compression machines are capable of being operated at fairly rapid speeds, these machines are limited in operation since only a single pellet is formed in each mold by the complete operating cycle which includes filling the mold, applying a compression force and ejecting the resulting pellet.

In accordance with the present invention there is provided an improved method of forming a plurality of pellets in a single mold during each operating cycle. This is accomplished by constructing a mold of a plurality of laminated plates having a common passage therethrough. This passage is filled with powdered material which is to be formed into pellets and a compression force is applied to the column of material. Following this compression, alternate plates are displaced transversely of the axis of the column to shear the column into a plurality of segments, thereby forming individual pellets. The plates are then realigned and the column of pellets is ejected from the common passage.

Accordingly, it is an object of this invention to provide an improved method of forming a plurality of pellets in a single operation.

A further object is to provide an improved molding press capable of forming a plurality of pellets in a single cycle of operation.

A further object is to provide means for forming a plurality of pellets by compressing a column of material and subsequently shearing the column into a plurality of segments.

Various other objects, advantages and features of this invention should become apparent from the following detailed description taken in conjunction with the accompanying drawing in which:

Figure 1 is an elevation view, shown partially in section, of a first embodiment of the molding press of this invention;

Figure 2 is a detailed view of the cam follower assembly of Figure 1;

Figure 3 is a sectional view taken along line 3—3 in Figure 1;

Figure 4 is a schematic representation of the operation of the molding press of Figure 1;

Figures 6a, 6b and 6c illustrate the operation of the hydraulic valve of Figure 5; and Figure 7 is a fragmentary view showing a modified form of the mold assembly.

Figure 5:
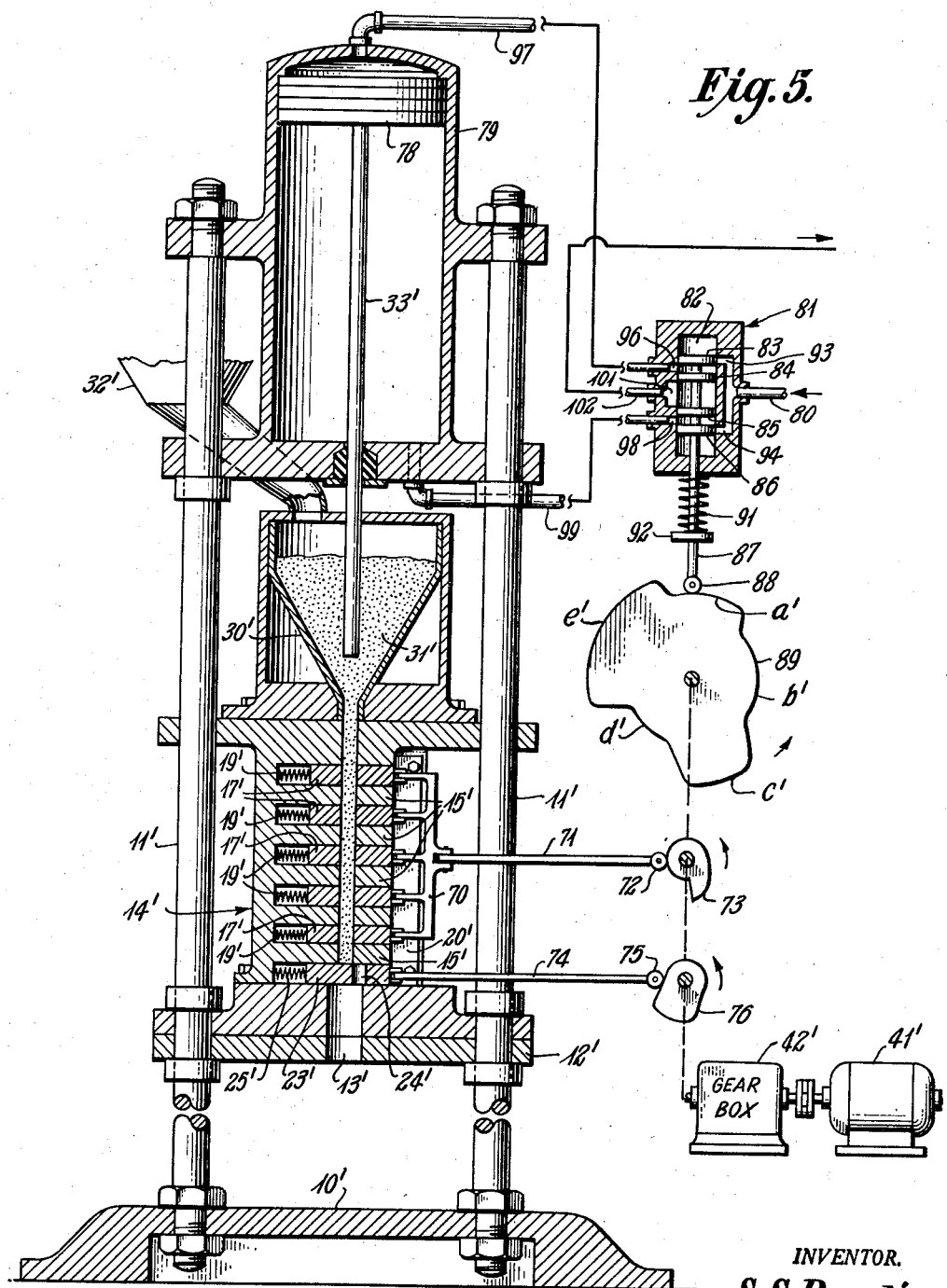
Figure 5 is an elevation view, shown partially in section, of a second embodiment of the molding press of this invention.

Referring now to the drawing in detail and to Figure 1 in particular, there is shown a molding press which is mounted on a base 10. Upright frame members 11 are attached at their lower ends to base 10, and a support plate 12 having a central opening 13 therein is mounted between frame members 11 at a position spaced above base 10. A pellet mold 14 is attached to frame members 11 and rests upon support plate 12. Mold 14 includes a plurality of plates 15 which are spaced from one another and which are provided with a common central vertical passage 16 in alignment with opening 13 in support plate 12. A slideable shear plate 17 is disposed between each adjacent pair of plates 15. Each of plates 17 is provided with a central opening 18 therein, see Figure 3, which is in alignment with the central passage 16 through plates 15 when plates 17 occupy first relative positions with respect to plates 15. A compression spring 19 is disposed between the back of mold 14 and each of plates 17, and stop plates 20, see Figure 3, are attached to mold 14 adjacent each of plates 17 such that the edges of plates 17 opposite springs 19 are held in engagement with the stop plates by the forces of springs 19. In this manner openings 18 are retained in alignment with the central passage 16 through plates 15. Connecting rods 22 are attached to shear plates 17 and extend outwardly therefrom. A stop plate 23 having an opening 24 therein is positioned below the lowermost shear plate 17. A compression spring 25 is interposed between the back of mold 14 and stop plate 23 so that opening 24 normally is out of alignment with the central passage 16 through plates 15. A connecting rod 26 is attached to the end of stop plate 23 opposite spring 25.

A hopper 30 is positioned above mold 14 and is in communication with the central passage 16 through plates 15 of mold 14. This hopper is filled from a supply conduit 32 with a mass of solid particulate material 31 which is to be formed into pellets. A plunger 33 extends through hopper 30 in alignment with the central passage 16 through mold 14. The upper end of plunger 33 extends upwardly from hopper 30 through a first guide plate 34, a cam follower plate 35 and a second guide plate 36. Guide plates 34 and 36 are provided with respective bearings 37 and 38 to allow free movement of plunger 33 therethrough. Plunger 33 is rigidly attached to cam follower plate 35, and this latter plate is provided with bearings 39 which engage frame members 11 to allow free movement of cam follower plate 35 in a vertical direction. A compression spring 40 is interposed between plates 35 and 36 to exert a downward force on cam follower plate 35, which force tends to move the lower end of plunger 33 into the central passage 16 in mold 14.

A cam 43 is suitably attached to the molding press for rotation in a vertical plane such that the edge of cam 43 engages a cam roller 45 which is mounted in plate 35, see Figure 2. Cam 43 is rotated by means of a motor 41 which is connected through a gear box 42 to a first pulley 48. A belt 49 encircles pulley 48 and a second pulley 50 which is attached to a shaft 51. A first bevel gear 52 is mounted on the opposite end of shaft 51 to engage a bevel gear 53 which is mounted on shaft 44 of cam 43. This assembly imparts rotary motion to cam 43 in the illustrated counterclockwise direction. Cam 43 thus engages roller 45 to exert an upward force on plate 35 in opposition to the downward force of compression spring 40. In this manner plunger 33 is moved vertically by cam 43.

A second bevel gear 55 is mounted on shaft 51 to engage a bevel gear 56 which is mounted on a shaft 57. Shaft 57 extends through mold 14 adjacent shear plates 17. Disks 60, having upwardly extending pins 61 thereon, see Figure 3, are attached in spaced relation on shaft 57. These pins 61 are adapted to engage respective arms 62 on connecting rods 22 such that connecting rods 22 are displaced in the direction of shear plate 17 once during each revolution of shaft 57. This movement of connecting rods 22 displaces plates 17 to the illustrated positions 17a such that openings 18 are moved out of alignment with the central passage 16 through mold 14 and occupying position 18a. A disk 64 is attached to shaft 57 adjacent plate 23, and a pin 65 thereon moves connecting rod 26 to displace plate 23 during a portion of each revolution of shaft 57.

The operation of the molding press of Figure 1 can be explained in conjunction with the schematic drawing of Figure 4. During the first portion of each cycle of operation, cam 43 is in the position illustrated in Figure 1 and at the left of Figure 4 such that cam edge a engages roller 45 to retain the lower end of shaft 33 in an up position out of passage 16. During this portion of the operating cycle, the powdered material in hopper 30 is allowed to fill the central passage 16 in the mold. At this same time the openings 18 in plates 17 are in alignment with passage 16 such that a common passage extends between hopper 30 and stop plate 23. At the next position, edge b of cam 43 is rotated into engagement with roller 45 which results in the lower end of plunger 33 being lowered into the upper portion of passage 16 whereby the lower end of plunger 33 is adjacent the upper edge of the uppermost shear plate 17. This results in a compression force being applied to the column of material contained within the central passage 16. At the third position, edge c of cam 43 engages roller 45 which withdraws plunger 33 slightly from mold 14 to release the compression force on the column of material. However, plunger 33 is not withdrawn completely from passage 16, so that no additional material 31 can enter the passage. At this same time, disks 60 are rotated by shaft 57 such that pins 61 engage respective arms 62 to displace shear plates 17 against the forces of compression springs 19, as illustrated in Figure 3 by position 17a. This results in the compressed column of material being sheared into a plurality of individual pellets. During the fourth portion of the cycle, edge d of cam 43 engages roller 45 whereby the lower end of plunger 33 is moved downwardly through passage 16 and through openings 18 in each of shear plates 17. This movement of plunger 33 is possible because plates 17 are displaced only momentarily and are restored to their original positions by springs 19 before edge d of cam 43 engages roller 45. At the beginning of step d, disk 64 is rotated by shaft 57 to move stop plate 23 against the force of spring 25 such that opening 24 is in alignment with passage 16 and opening 13 in support plate 12. Thus, plunger 33 expels each of the individual pellets 70 from the mold into a collecting device, not shown, which is positioned beneath opening 13.

In Figure 5 there is shown a hydraulic operated molding press which is generally similar to that shown in Figure 1 and wherein corresponding parts are designated by like primed reference numerals. Shear plates 17' are connected to a yoke 70 which is connected to one end of a connecting rod 71. The second end of rod 71 is provided with a cam follower 72 which engages a cam 73. Stop plate 23' is attached to one end of a connecting rod 74. The second end of connecting rod 74 is provided with a cam follower 75 which engages a cam 76. Cams 73 and 76 are mechanically coupled to the drive shaft of gear box 42'.

The upper end of plunger 33' is attached to a piston 78 which is contained within a cylinder 79, the latter being supported by frame members 11'. Hydraulic fluid is supplied from a pump, not shown, to an inlet conduit 80 which communicates with a hydraulic valve 81. Valve 81 comprises a cylinder 82 having four spaced pistons 83, 84, 85 and 86 mounted therein and attached to a drive shaft 87 which terminates in a cam follower 88. A cam 89 which is rotated by motor 41' engages cam follower 88 and a compression spring 91 is interposed between cylinder 82 and a flange 92 which is attached to shaft 87. Conduit 80 communicates with the interior of cylinder 82 through a pair of inlet ports 93 and 94. A first outlet port 96 in valve 81 communicates with the region of cylinder 79 above piston 78 through a conduit 97; a second outlet port 98 in valve 81 communicates with the region of cylinder 79 below piston 78 through a conduit 99; and a third outlet port 101 in valve 81 is connected to a conduit 102 which forms the return path of fluid to a reservoir, not shown, communicating with the hydraulic pump.

The operation of the press of Figure 5 can be explained in conjunction with Figures 6a, 6b and 6c which show the several positions of the pistons in hydraulic valve 81. At the beginning of the cycle, the piston assembly of valve 81 is in the position illustrated in Figures 5 and 6a wherein cam follower 88 engages edge a' of cam 89. Pistons 83 and 86 block respective inlet ports 93 and 94 such that piston 78 remains stationary at the upper end of cylinder 79. The lower end of plunger 33' is within hopper 30' as shown in Figure 5. During the second portion of the cycle, cam 89 is rotated such that edge b' engages cam follower 88 to move the piston assembly of valve 81 to the position shown in Figure 6b whereby inlet port 93 is in communication with outlet port 96. Thus hydraulic fluid passes from conduit 80 into the region of cylinder 79 above piston 78 to force plunger 33' downward to a position corresponding to step b in Figure 4. Inlet port 94 is blocked by piston 85.

During the third portion of the cycle, cam 89 is rotated so that edge c' engages cam follower 88 to move the piston assembly of valve 81 to the position shown in Figure 6c. Inlet port 94 is in communication with outlet port 98 whereby fluid passes from conduit 80 into the region of cylinder 79 below piston 78. At this time inlet port 93 is blocked by piston 84. This latter position results in plunger 33' assuming a position shown corresponding to step c in Figure 4.

During the fourth portion of the cycle, cam 89 is rotated such that edge d' engages cam follower 88 to move the piston assembly of valve 81 to the position shown in Figure 6b. Once again fluid is passed into cylinder 79 above piston 78 to move plunger 33' to a position corresponding to step d in Figure 4. During the fifth portion of the cycle, cam 89 is rotated such that edge e' engages cam follower 88 to return the piston assembly of valve 81 to the position shown in Figure 6c. Again fluid is passed into cylinder 79 beneath piston 78 to force plunger 33' to the position shown in Figure 5. This completes the cycle.

Cams 73 and 76 operate to displace respective rods 71 and 74 at times corresponding to the displacements of rods 22 and 26 of the press of Figure 1. In this manner shear plates 17' are displaced following compression of the column of material in passage 16', and stop plate 23' is displaced such that the sheared column can be expelled from the mold by plunger 33'.

In Figure 7, there is shown a modified form of the mold assembly wherein shear plates 17 are attracted to an electromagnet 105 to cause displacement thereof. In this particular embodiment, shear plates 17 normally are retained in a position such that openings 18 are in alignment with passage 16. This is accomplished by means of tension springs 106 which hold shear plates 17 against stop plates 108. The coil 110 of magnet 105 is connected in circuit with a current source 111 and a switch 112, the latter normally is retained open by a bias spring 113.

Switch 112 is closed at a predetermined time by rotation of a cam 114 to energize magnet 105. This attracts shear plates 17 against the forces of tension springs 106 which results in the compressed column of material being divided into individual pellets. Stop plates 23 normally is positioned by means of a tension spring 116 which retains plate 23 against a stop plate 117 such that its opening 24 is out of alignment with passage 16. A magnet 118 is positioned adjacent stop plate 23 to cause movement thereof to align opening 24 with passage 16. The coil 119 of magnet 118 is connected in circuit with a current source 120 and a switch 121, the latter normally is retained open by a biasing spring 122. Switch 122 is closed during a predetermined portion of the cycle by rotation of a cam 123 into engagement therewith. This energizes magnet 118 to attract stop plate 23.

In view of the foregoing description of preferred embodiments of this invention it should be apparent that there is provided an improved system for forming a plurality of pellets in a single operation. This is accomplished by compressing a column of material and subsequently dividing the column into a plurality of segments thereby forming the individual pellets. The several forms of operating mechanism described in conjunction with this invention are merely illustrative of suitable equipment which can be employed to carry out this process. Obviously, details of the operating mechanism can be varied without departing from the scope of this invention. Passage 16 can be any desired shape depending upon the shape of pellets desired.

While the invention has been described in conjunction with present preferred embodiments thereof the invention obviously is not limited thereto.

What is claimed is:

1. Apparatus for forming a plurality of pellets comprising, in combination, a mold including a plurality of spaced plates having a common passage therethrough, a movable plate disposed between each adjacent pair of spaced plates, each of said movable plates having an opening therethrough, means to align said movable plates with said spaced plates whereby the openings through said movable plates are aligned with said passage, means to fill said passage with a column of material to be formed into pellets, means to apply a compression force to said column of material, means to displace said movable plates thereby to divide said column of material into individual pellets, means to realign said plates, and means to eject the individual pellets from said passage.

2. Apparatus for forming a plurality of pellets comprising, in combination, a mold including a plurality of spaced plates having a common passage therethrough, a movable plate disposed between each adjacent pair of spaced plates, each of said movable plates having an opening therethrough, means to align said movable plates with said spaced plates whereby the openings through said movable plates are aligned with said passage, a hopper communicating with one end of said passage, a movable plunger adapted to extend into said passage, a stop plate disposed across the second end of said passage, means to position said plunger into at least a part of said passage to compress material therein from said hopper, means to displace said movable plates thereby to divide the compresssed material into individual pellets, means to realign said plates, means to remove said stop plate from the second end of said passage, and means to move said plunger through said passage to eject the individual pellets from said passage.

3. The combination in accordance with claim 2 wherein said hopper is positioned above said mold and wherein said plunger passes downwardly through said hopper into said mold.

4. Apparatus for forming a plurality of pellets comprising, in combination: a frame member; a mold supported by said frame member, said mold including a plurality of spaced plates having a common passage therethrough; a movable plate disposed between each adjacent pair of spaced plates, each of said movable plates having an opening therethrough; means to align said movable plates with said spaced plates whereby the openings through said movable plates are aligned with said passage; means to fill said passage with a quantity of material to be formed into pellets; a plunger attached to said frame member for movement into and out of one end of said passage; a stop plate having an opening therein; means to position said stop plate across the second end of said passage whereby the opening in said stop plate is out of alignment with said passage; a cam attached to said frame member; means to rotate said cam; and means under control of said cam to move said plunger to compress a column of material in said passage, then to displace said movable plates to divide the compressed column into a plurality of segments, then to return said movable plates to their original positions, then to displace said stop plate whereby the opening therein is in alignment with said passage, and finally to move said plunger through said passage to eject the segments of said column of material.

5. The combination in accordance with claim 4 wherein said last-mentioned means comprises a spring tending to force said plunger into said passage, the force of said spring being overcome by said cam; and means driven by said cam to overcome the forces of said means to align said movable plates and said stop plate.

6. The combination in accordance with claim 4 wherein said last-mentioned means comprises a piston attached to said plunger, a cylinder enclosing said piston, a source of fluid pressure, and valve means under control of said cam to pass fluid from said source into said cylinder; and means driven by said cam to overcome the forces of said means to align said movable plates and said stop plate.

References Cited in the file of this patent

UNITED STATES PATENTS

| | | |
|---|---|---|
| 1,029,488 | Burghhoff et al. | June 11, 1912 |
| 1,533,649 | Hopkins | Apr. 14, 1925 |
| 2,316,298 | Strunk | Apr. 13, 1943 |
| 2,323,785 | Beeton et al. | July 6, 1943 |
| 2,614,290 | Street | Oct. 21, 1952 |

FOREIGN PATENTS

| | | |
|---|---|---|
| 465,939 | France | Apr. 30, 1914 |